United States Patent
Murry et al.

[11] Patent Number: 6,127,758
[45] Date of Patent: Oct. 3, 2000

[54] RAM AIR TURBINE SYSTEM

[75] Inventors: Roger P. Murry, San Pedro, Calif.;
Eric L. Poulson, Bellingham, Wash.

[73] Assignee: AlliedSignal Inc., Morristown, N.J.

[21] Appl. No.: 08/976,821

[22] Filed: Nov. 24, 1997

Related U.S. Application Data

[60] Provisional application No. 60/059,317, Sep. 17, 1997.

[51] Int. Cl.[7] .............................. B64D 41/00; F03D 7/04; H02K 17/42
[52] U.S. Cl. ..................... 310/168; 310/112; 244/53 R; 290/55; 60/226.1
[58] Field of Search ............................. 310/52, 58, 60 R, 310/67 R, 68 B, 68 E, 112, 168, 171; 244/53 B, 53 R, 59, 60; 60/226.1, 226.3; 290/44, 55; 415/121.3, 905, 908

[56] References Cited

U.S. PATENT DOCUMENTS

| | | | |
|---|---|---|---|
| 2,893,204 | 7/1959 | Anderson, et al. | 60/39.183 |
| 4,213,734 | 7/1980 | Lagg | 415/4.3 |
| 4,554,501 | 11/1985 | Baker | 322/29 |
| 4,578,019 | 3/1986 | Sarafik | 416/1 |
| 5,309,029 | 5/1994 | Gregory et al. | 290/1 R |
| 5,794,432 | 8/1998 | Dunbar et al. | 60/204 |

FOREIGN PATENT DOCUMENTS

| | | |
|---|---|---|
| 1 406 609 | 10/1968 | Germany . |
| 3304845 | 11/1984 | Germany . |
| 3824468 | 1/1990 | Germany . |
| 996166 | 6/1965 | United Kingdom . |

*Primary Examiner*—Elvin Enad
*Assistant Examiner*—Judson H. Jones
*Attorney, Agent, or Firm*—William J. Zak, Jr., Esq.

[57] ABSTRACT

A ram air turbine includes a reaction turbine and an electrical generator that is driven by shaft power of the reaction turbine. A scoop directs a flow of ram air to an inlet of the reaction turbine and creates a pressure head for the reaction turbine. The reaction turbine and the scoop are contained entirely within a pod. The ram air turbine further includes a turbocompressor, including a turbine stage and a compressor stage, which provides a stream of cooled air to equipment inside the pod. The turbocompressor also reacts loads shed by the electrical generator.

19 Claims, 3 Drawing Sheets

RAM AIR TURBINE SYSTEM

This application claims priority Under 35 USC Section 119 to provisional Application No. 60/059,317, filed Sep. 17, 1997.

BACKGROUND OF THE INVENTION

The invention relates to ram air turbine systems. More specifically, the invention relates to a ram air turbine system that provides electrical power and cooling for an aircraft pod.

Ram air turbine systems provide electrical power and cooling to electronic equipment inside self-contained pods of military aircraft. A ram air turbine system typically includes a propeller that is mounted external the aircraft pod. When placed in the airstream, the propeller drives an electrical generator, which generates electrical power for the electronic equipment. Cooling is provided by allowing ram air to enter the pod and directly exposing the electronic equipment to the ram air.

As the electronic equipment becomes more advanced, it will become more power-hungry and less tolerant to heat. Unless the present ram turbine systems are increased in size and weight, they will not be capable of providing sufficient electrical power and cooling to the advanced electronic equipment. However, increasing the size and weight of the ram turbine system is a luxury that cannot be afforded.

SUMMARY OF THE INVENTION

The invention can be regarded as a ram air turbine system comprising a ram air turbine and a scoop. The ram air turbine includes a reaction turbine and a variable-speed electrical generator driven by shaft power of the reaction turbine. The scoop directs a flow of ram air to an inlet of the reaction turbine and creates a pressure head for the reaction turbine.

The invention can also be regarded as a ram air turbine comprising a shaft; a reaction turbine coupled to the shaft; an electrical generator coupled to the shaft; and a turbocompressor including a compressor stage coupled to the shaft. The electrical generator applies a first load to the shaft when electrical energy is extracted from the electrical generator. The compressor stage applies a second load to the shaft, the second load being a non-linear function of shaft speed. The compressor stage increases the second load on the shaft when the first load is shed by the electrical generator, whereby the compressor stage reacts the first load shed by the electrical generator.

DETAILED DESCRIPTION OF THE INVENTION

Figure 1:
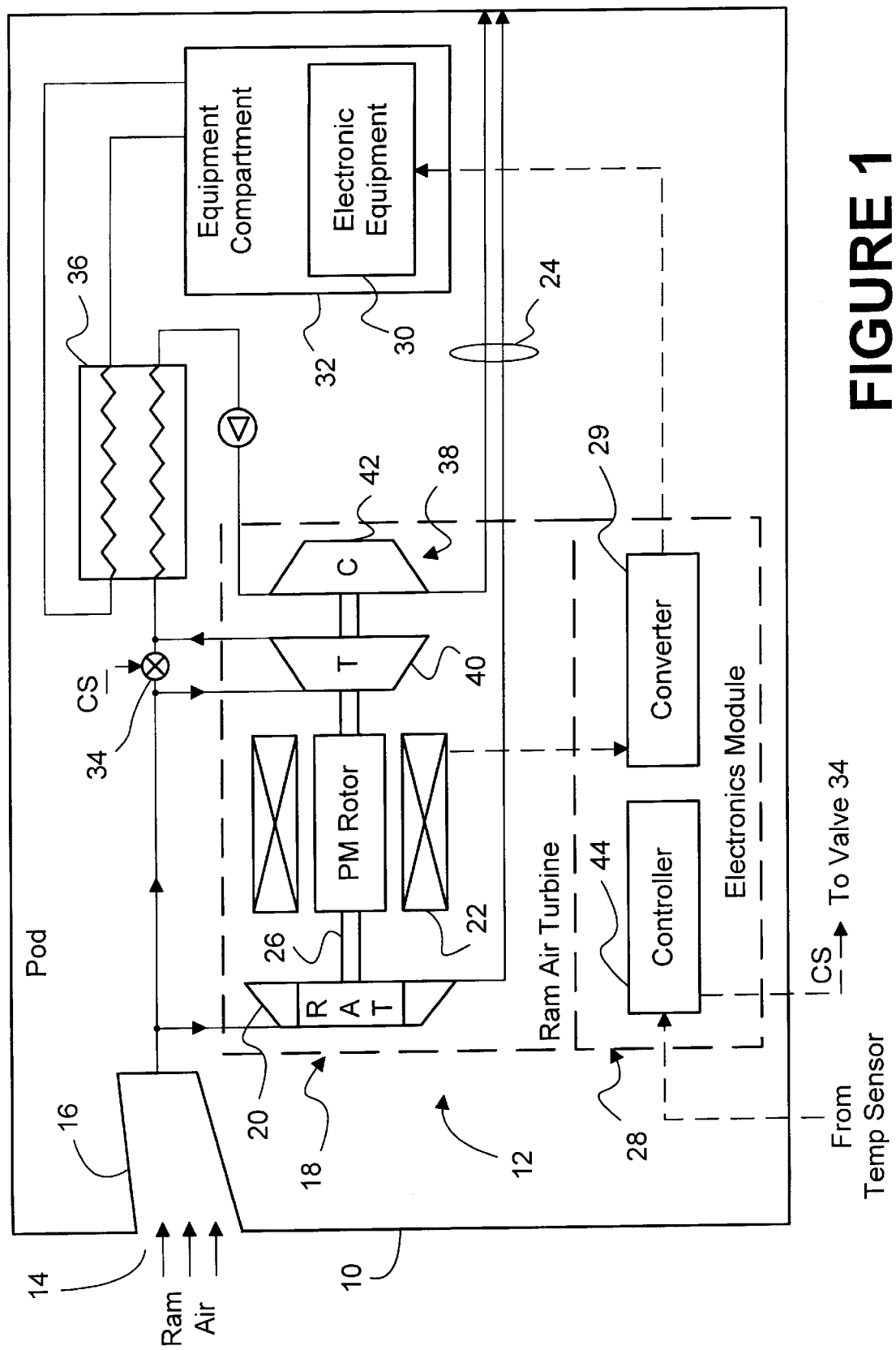
FIG. 1 is a schematic diagram of an aircraft pod including a ram air turbine system according to the present invention.

FIG. 1 shows an aircraft pod 10 and a ram air turbine system 12 contained entirely within the pod 10. The pod 10 is mounted to the underside of an aircraft, typically to a wing or fuselage. During flight of the aircraft, the pod 10 hangs freely in the airstream. The flight envelope of the aircraft might cover subsonic speeds at sea level and transonic speeds at high altitude. Air enters into the pod 10 through an inlet 14. The pod inlet 14 is not covered by a door. Therefore, the pod 10 has a fixed inlet geometry.

The ram air turbine system 12 includes a scoop 16 and a ram air turbine 18. The ram air turbine 18 includes a reaction turbine 20 and a variable-speed electrical generator 22. The scoop 16 directs ram air from the pod inlet 14 to an inlet of the reaction turbine 20. In addition to directing the ram air, the scoop 16 slows the flow of ram air to create a pressure head for the reaction turbine 20.

The reaction turbine 20 has a low-flowrate, high-head design. The reaction turbine 20 includes rotor blades and stator vanes or nozzles (not shown), which turn and expand the ram air onto the rotor blades without slowing the speed of the ram air. The stator vanes do not move. Shaft power generated by the reaction turbine 20 is determined by the momentum in the ram air exiting the nozzles and the angle of incidence of the ram air impinging the rotor blades. Maximum power is obtained when the turbine nozzle exit swirl matches the angular speed of the rotor blades.

The ram air exiting the reaction turbine 20 is directed out of the pod 10 via a constant-velocity exit section 24. The ram air is returned to the free airstream at slightly below static pressure to provide the pressure head needed to obtain an efficient cycle. The constant-velocity section 24 can be a sheet metal or fiberglass duct section that maintains constant flow area.

The reaction turbine 20 provides inherent protection against overspeed. At fixed ram air supply conditions, higher angular blade speed results in negative angles of incidence and loss of turbine torque. For example, the turbine torque might drop off by 50 percent at 50% overspeed.

The variable-speed electrical generator 22 is driven by shaft power of the reaction turbine 20. The electrical generator 22 can be a permanent magnet machine such as a ring-wound, two-pole toothless permanent magnet machine. Such a permanent magnet machine can be driven at shaft speeds; therefore, its rotor and the reaction turbine 20 can be mounted directly to a common shaft 26, without the need for a gearbox. The electrical generator 22 is allowed to overspeed.

The electrical generator 22 is driven by the reaction turbine 20 at variable speeds because load and flight conditions change during the flight of the aircraft. Consequently, the electrical generator 22 generates electrical power having a variable frequency and variable voltage.

The variable frequency, variable voltage power is extracted from the electrical generator 22 and converted to fixed voltage dc power by an electronics module 28. The electronics module 28 can include means 29 such as a transformer, rectifier, up-chopper and filter for performing the power conversion. The electronics module 28 can be secured to an outer surface of the ram air turbine 18, whereby the ram air turbine 18 provides EMI shielding for the electronics module 28. The fixed voltage dc power is supplied to electronic equipment 30 inside an equipment compartment 32 of the pod 10.

The ram air turbine system 12 also provides cooling for the electronic equipment 30. When ram air entering the pod 10 is sufficiently cold enough (e.g., less than 40° C.) to provide cooling for the electronic equipment 30, a valve 34 is opened and some of the ram air is diverted from just upstream of the reaction turbine 20 and supplied to the cold side of a liquid/air load heat exchanger 36. Heat is removed from liquid coolant flowing through the hot side of the heat exchanger 36. The liquid coolant leaving the hot side of the heat exchanger 36 is supplied to the equipment compartment 32, where the coolant provides a heat sink for the electronic equipment 30. Liquid coolant leaving the equipment compartment 32 is returned to the hot side of the heat exchanger 36. The ram air leaving the cold side of the heat exchanger 36 is vented via the constant velocity section 24 to the free airstream.

The ram air turbine 18 further includes a turbocompressor 38, which includes a turbine stage 40 and a compressor stage 42 coupled to the shaft 26. Locating the turbine stage 40 and the compressor stage 42 on the same side of the electrical generator 22 allows the shaft 26 to have a higher stiffness than locating the turbine stage 40 and compressor stage 42 on opposite sides of the electrical generator 22. When the ram air entering the pod 10 is not cold enough to provide cooling (e.g., greater than 40° C.), the turbocompressor 38 provides the cooling. The turbocompressor 38 uses an expanded ram air cycle to provide the cooled air. The valve 34 is closed, the diverted ram air is expanded in the turbine stage 40, and cooled air leaving the turbine stage 40 is supplied to the cold side of the heat exchanger 36. The ram air leaving the cold side of the heat exchanger 36, which was expanded to sub-ambient pressure in the turbine stage 40, is pressurized to the pod exhaust pressure by the compressor stage 42 and vented to the free airstream via the constant-velocity section 24.

The compressor stage 42 has a load line that follows a speed-cubed characteristic. At nominal design conditions, the turbocompressor 38 is self-powered in that the turbine stage 40 puts out enough torque to balance the load torque from the compressor stage 42. However, when the shaft speed increases above the nominal, the compressor stage load increases as a non-linear function of the shaft speed.

The load line of the compressor stage 42 is advantageously used to create a balanced load-sharing between the electrical generator 22 and the compressor stage 42. While the electronics module 28 is extracting energy from the electrical generator 22, a generator load is placed on the shaft. When the electronics module 28 stops extracting the energy, the generator load is shed and shaft speed begins to increase. However, the load shed by the electrical generator 22 is reacted by the compressor stage 42. The increase in shaft speed causes the compressor stage load to increase and ultimately limit the shaft speed. Thus, the shaft speed is inherently limited without the need for a speed governor or any other active speed control. When the generator load is reapplied, the shaft speed and compressor stage load are decreased.

In addition to performing power conversion, the electronics module 28 controls the ram air turbine system 12. The electronics module includes a controller 44 for controlling the valve 34. The controller 44 receives a signal from a temperature sensor indicating temperature of the ram air entering the pod 10, and compares the indicated temperature to a threshold (e.g., 40° C.). If the indicated temperature exceeds the threshold, the controller 44 generates a control signal CS for the valve 34, causing the valve 34 to close. Ram air flows to an inlet of the turbine stage 40, and cooled air is ducted from an outlet of the turbine stage 40 to the cold side of the heat exchanger 36. If the indicated temperature does not exceed the threshold, the valve 34 is opened and the ram air is supplied directly to the cold side of the heat exchanger 36. The turbocompressor 38 needs only the ram air in order to operate.

The electronics module 28 provides electrical power to the electronic equipment 30 on command from the aircraft. In addition to supplying electrical power to the pod 10, the ram air turbine system 12 can also supply electrical power to a power bus of the aircraft.

Figure 2:
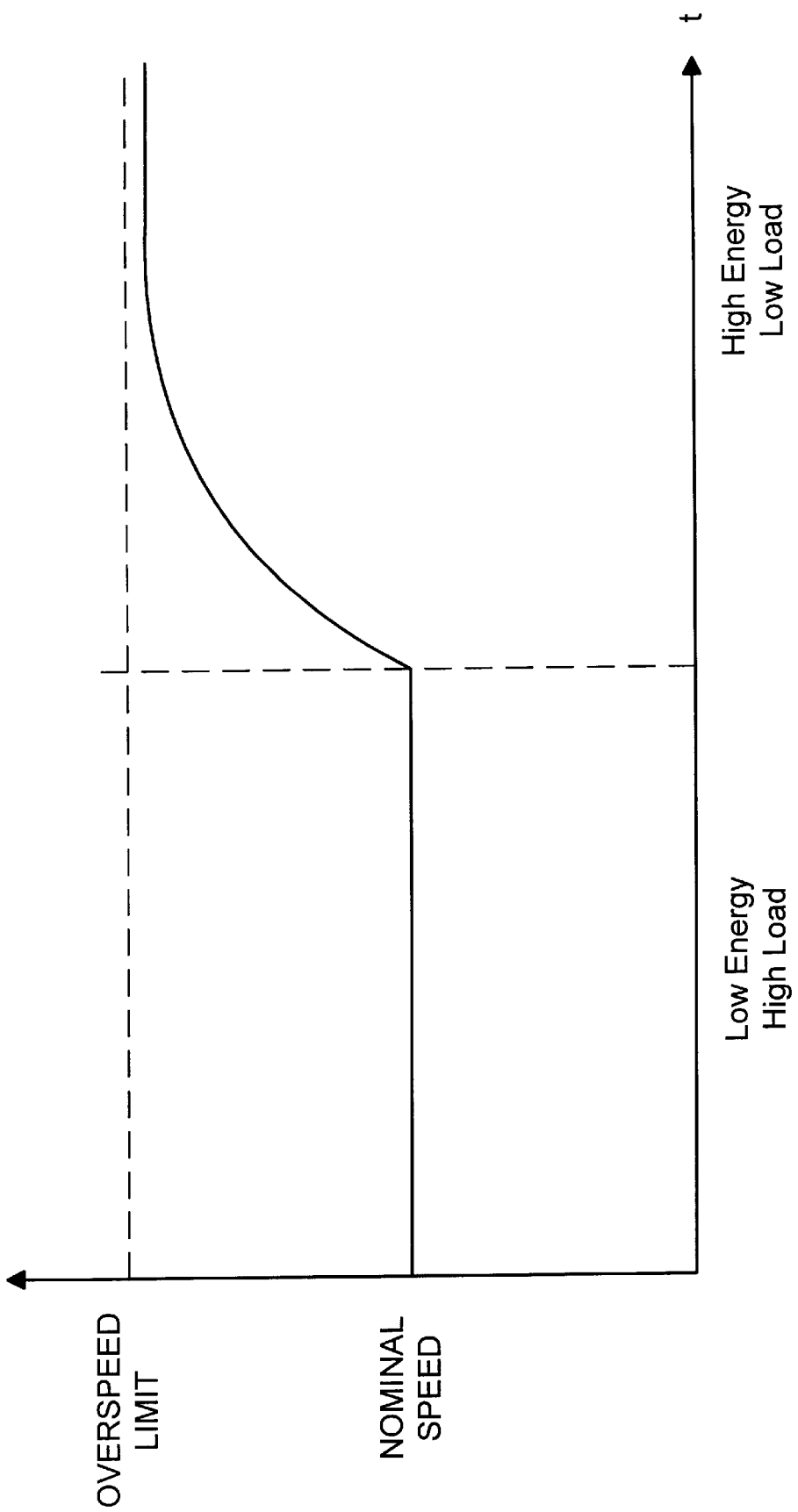
FIG. 2 is a plot of shaft speed versus time for different flight and load conditions of the ram air turbine system.

Reference is now made to FIG. 2. During the flight of the aircraft, load conditions of the electrical generator 22 and flight conditions of the aircraft will change. For example, the aircraft is at the low energy part of the flight envelope (i.e., low altitude and low Mach number) and the electrical generator is fully loaded. The shaft 26 is rotating at a nominal speed (e.g., approximately 11,000 rpm). However, the aircraft suddenly accelerates to a high energy part of the flight envelope (i.e., high altitude and transonic speed) and the load is shed. The shaft speed increases but is eventually (and inherently) limited below an overspeed limit (e.g., approximately 28,000 rpm).

Figure 3:
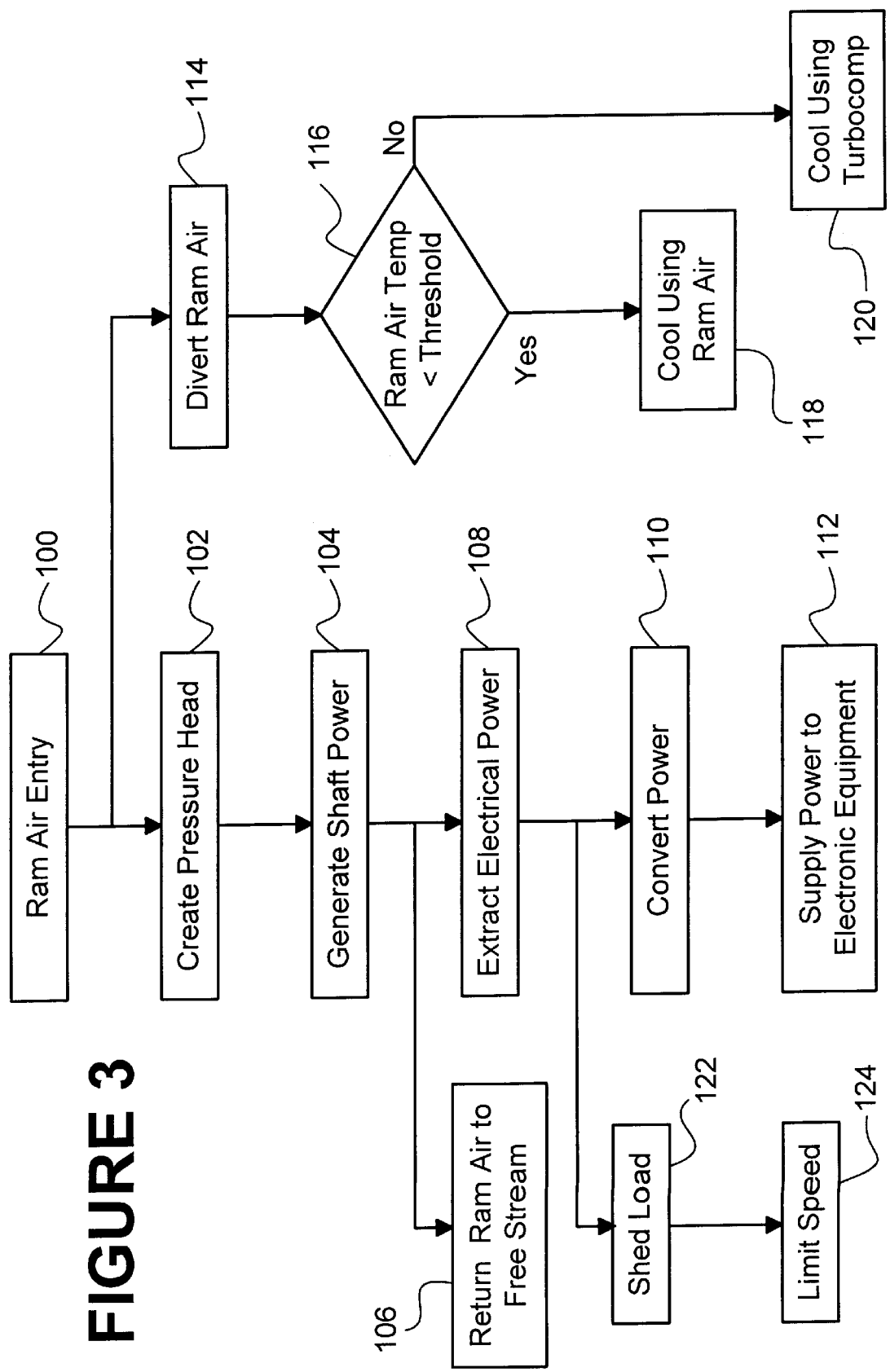
FIG. 3 is a flowchart of a method of operating the ram air turbine system.

FIG. 3 shows a method of operating the ram air turbine system 12. During flight of the aircraft, ram air enters the pod inlet 14 (block 100). The scoop 16 directs the ram air to the reaction turbine 20 and creates a pressure head for the reaction turbine 20 (block 102). The reaction turbine generates shaft power (step 104), while air leaving the reaction turbine 20 is returned to the free airstream (block 106).

The shaft power drives the electrical generator 22. On command from the aircraft, variable frequency, variable voltage power is extracted from the electrical generator 22 (block 108) and converted to fixed voltage dc power (block 110). The fixed voltage dc power is supplied to the electronics equipment 30 (block 112).

Cooling is also provided to the electronics equipment 30. Ram air is diverted just upstream of the reaction turbine 20 (block 114). If temperature of the ram air is below the threshold (block 116), the diverted air flows directly to the cold side of the heat exchanger 36 (block 118). If temperature of the ram air is above the threshold (block 116), the controller 44 generates the control signal CS, which commands the valve 34 to allow the diverted air to flow to the inlet of the turbine stage 40. The turbine stage 40, in turn, supplies cooled air to cold side of the heat exchanger 36 (block 120).

While electrical power is being extracted from the electrical generator 22, a load is placed on the shaft 26. When the aircraft commands the electronics module 28 to stop supplying electrical power to the electronic equipment 30, the load is shed (block 122) and the shaft 26 begins to speed up. In response to the increased shaft speed, the compressor stage 42 increases its load on the shaft 26, eventually limiting the shaft speed (block 124).

Thus disclosed is a ram air turbine system 12 which, due to the reaction turbine 20, operates at higher shaft speeds than propeller-driven ram air turbine systems. Higher shaft speed allows the electrical generator 22 to run at higher tip speeds, which results in a higher power output for powering the advanced electronic equipment 30. The higher shaft speeds also allow the use of an expansion cooling cycle, which allows for greater cooling of the advanced electronic equipment 30. Additionally, the higher shaft speed also allows the electrical generator 22 to be driven directly by the reaction turbine 20, thereby eliminating the need for a gearbox and the associated weight and maintenance concerns.

The reaction turbine 20 and the compressor stage 42 provide an inherent speed governor for the ram air turbine 18, thereby eliminating the need for a speed governor or any other active control of the shaft speed. Because the speed is inherently governed, and also because the electrical generator 22 is allowed to overspeed, a door for the pod inlet 14 is not needed. Thus avoided is the need for a variable geometry air inlet, which has inherent problems, especially for an aircraft flying at transonic speeds.

Modifications can be made without departing from the spirit and scope of the invention. For example, the generator load could be reacted by equipment (e.g., a fan) other than the compressor stage 42. Moreover, size and speed of the ram air turbine system 12 is dependant upon many factors, including efficiency of the scoop 16 and operating requirements such as the loiter line of aircraft and power consumption and heat dissipation of the electronic equipment 30. For example, the ram air turbine system 12 might be sized to generate maximum power at minimum airspeed.

We claim:

1. A ram air turbine system comprising:

a ram air turbine including a reaction turbine and a variable-speed electrical generator driven by shaft power of the reaction turbine; and a scoop for directing a flow of ram air to an inlet of the reaction turbine and for creating a pressure head for the reaction turbine.

2. The system of claim 1, further comprising a housing, the scoop and the ram air turbine being contained entirely within the housing.

3. The system of claim 2, wherein the housing includes a fixed geometry inlet for the scoop.

4. The system of claim 1, further comprising a pod, the scoop and the ram air turbine being contained entirely within the pod, the pod having a fixed geometry inlet for the scoop.

5. The system of claim 1, wherein the electrical generator includes a permanent magnet rotor, and wherein the permanent magnet rotor and the reaction turbine are mounted directly to a common shaft.

6. The system of claim 1, wherein the ram air turbine further includes a turbocompressor coupled to the reaction turbine, the turbocompressor being operable to provide a stream of cooled air using an expanded air cycle.

7. The system of claim 6, wherein the turbocompressor includes a compressor stage, wherein the reaction turbine, the compressor stage and the electrical generator are coupled to a common shaft, wherein the electrical generator applies a first load to the shaft when electrical energy is extracted from the electrical generator, wherein the compressor stage applies a second load to the shaft, the second load being a non-linear function of the speed of the shaft, the compressor stage increasing the second load on the shaft when the first load is shed by the electrical generator, whereby the compressor stage reacts the first load shed by the electrical generator.

8. The system of claim 6, wherein the turbocompressor includes a turbine stage and a compressor stage, the turbine stage and the compressor stage being located on the same side of the electrical generator.

9. The system of claim 6, further comprising:

a liquid coolant loop including a heat exchanger; and means, responsive to a control signal, for diverting ram air upstream the reaction turbine, the diverted air being supplied either to a cold side of the heat exchanger or to an inlet of the turbocompressor, whereby either the diverted ram air or the cooled air from the turbocompressor is supplied to the cold side of the heat exchanger.

10. The system of claim 1, further comprising an electronics module for converting electrical generator power from variable frequency, variable voltage power to fixed voltage dc power.

11. A ram air turbine comprising:

a shaft;

a reaction turbine coupled to the shaft;

an electrical generator coupled to the shaft, the electrical generator applying a first load to the shaft when electrical energy is extracted from the electrical generator; and a turbocompressor including a compressor stage coupled to the shaft, the compressor stage applying a second load to the shaft, the second load being a non-linear function of shaft speed, the compressor stage increasing the second load on the shaft when the first load is shed by the electrical generator, whereby the compressor stage reacts the first load shed by the electrical generator.

12. The ram air turbine of claim 11, wherein the electrical generator includes a permanent magnet rotor mounted directly to the shaft.

13. The ram air turbine of claim 11, wherein the turbocompressor further includes a turbine stage, the compressor stage and the turbine stage being located on the same side of the electrical generator.

14. A method of generating electricity inside an aircraft pod, the pod containing an electrical generator and a reaction turbine, the method comprising the steps of:

slowing a flow of ram air and recovering momentum of the ram air to create a pressure head for the reaction turbine;

using the pressure head to drive the reaction turbine to produce shaft power; and using the shaft power to drive the electrical generator;

extracting electrical power from the electrical generator, whereby a first load is applied to the shaft; and applying a second load to the shaft when the first load is removed from the shaft.

15. The method of claim 14, whereby the second load is increased in non-linear proportion to speed of the shaft.

16. The method of claim 14, wherein the second load is applied by a turbocompressor.

17. The method of claim 16, further comprising the steps of:

diverting a stream of ram air upstream the reaction turbine;

supplying the diverted air to the turbocompressor; and using the turbocompressor to provide cooling for the pod.

18. The method of claim 16, further comprising the step of diverting a stream of ram air upstream the reaction turbine to provide cooling for the pod.

19. The method of claim 14, wherein the electrical generator is operated at variable speed, wherein variable frequency, variable voltage power is extracted from the electrical generator; and wherein the method further comprises the step of converting the variable frequency, variable voltage power to fixed voltage dc power.

* * * * *